US012783253B2

(12) United States Patent
Levin et al.

(10) Patent No.: US 12,783,253 B2
(45) Date of Patent: Nov. 3, 2026

(54) ITERATIVELY EXECUTING SOFTWARE ON A HOST DEVICE WITH DIFFERENT ENABLED GROUPS OF PERIPHERALS

(71) Applicant: Google LLC, Mountain View, CA (US)

(72) Inventors: Alex Levin, San Jose, CA (US); Eric Joseph Herrmann, San Francisco, CA (US)

(73) Assignee: Google LLC, Mountain View, CA (US)

( * ) Notice: Subject to any disclaimer, the term of this patent is extended or adjusted under 35 U.S.C. 154(b) by 184 days.

(21) Appl. No.: 18/430,119

(22) Filed: Feb. 1, 2024

(65) Prior Publication Data

US 2025/0251945 A1 Aug. 7, 2025

(51) Int. Cl.
*G06F 9/4401* (2018.01)

(52) U.S. Cl.
CPC .................................. *G06F 9/4411* (2013.01)

(58) Field of Classification Search
CPC ... G06F 9/4411; G06F 9/4413; G06F 13/4081
See application file for complete search history.

(56) References Cited

U.S. PATENT DOCUMENTS

| | | | |
|---|---|---|---|
| 6,968,514 | B2 | 11/2005 | Cooke et al. |
| 7,397,273 | B1 | 7/2008 | Ng et al. |
| 7,904,864 | B2 | 3/2011 | Huynh et al. |
| 9,672,184 | B1 | 6/2017 | Jain et al. |
| 10,855,261 | B2 | 12/2020 | Yang et al. |
| 11,002,787 | B2 | 5/2021 | Wolff et al. |
| 11,144,494 | B1 | 10/2021 | Kao |
| 11,532,906 | B2 | 12/2022 | Huang et al. |

(Continued)

FOREIGN PATENT DOCUMENTS

| | | | |
|---|---|---|---|
| EP | 1235157 | A2 | 8/2002 |
| JP | 2003256360 | A | 9/2003 |

(Continued)

OTHER PUBLICATIONS

"International Preliminary Report on Patentability", Application No. PCT/US2022/077955, Apr. 16, 2024, 12 pages.

(Continued)

*Primary Examiner* — Raymond N Phan
(74) *Attorney, Agent, or Firm* — Colby Nipper PLLC

(57) ABSTRACT

Techniques and apparatuses are described that implement software-defined hardware. In example aspects, a hardware manager can enable and disable different combinations of peripherals coupled to a host device. Software can be executed on different enabled combinations of peripherals to determine which combinations best meet the requirements of a product. Combinations of peripherals can be updated with alternative or new peripherals that have new features or replace obsolete peripherals. Thus, the hardware manager can provide a modular validation platform that allows a manufacturer of electronic devices to skip a prototype phase, qualify new peripherals as replacements for existing peripherals that may become obsolete, and iterate between different combinations of peripherals to determine ideal combinations. The disclosed techniques and systems can therefore reduce resources, time, and costs associated with design and testing phases of electronic devices.

20 Claims, 9 Drawing Sheets

(56) References Cited

U.S. PATENT DOCUMENTS

| | | | |
|---|---|---|---|
| 11,546,992 B2 | 1/2023 | Hill et al. | |
| 12,436,900 B2 | 10/2025 | Levin et al. | |
| 12,554,854 B2 | 2/2026 | Schneider et al. | |
| 2005/0132110 A1 | 6/2005 | Daftardar | |
| 2006/0172606 A1 | 8/2006 | Irisawa | |
| 2007/0250136 A1 | 10/2007 | Karunasiri et al. | |
| 2008/0133165 A1* | 6/2008 | Iwamoto | G01R 31/31908 702/117 |
| 2008/0288666 A1 | 11/2008 | Hodges et al. | |
| 2009/0147207 A1 | 6/2009 | Goto | |
| 2011/0188070 A1* | 8/2011 | Pala | G06F 9/4411 358/1.15 |
| 2015/0234768 A1* | 8/2015 | Bass | G06F 13/4081 710/302 |
| 2015/0261696 A1 | 9/2015 | Christian et al. | |
| 2017/0094353 A1* | 3/2017 | Chang | H04N 21/43637 |
| 2018/0189159 A1 | 7/2018 | Carmichael et al. | |
| 2019/0087376 A1* | 3/2019 | Bolen | G06F 13/4081 |
| 2019/0121647 A1 | 4/2019 | Por | |
| 2019/0277907 A1 | 9/2019 | Wolff et al. | |
| 2019/0281118 A1* | 9/2019 | Kim | H04L 67/34 |
| 2020/0329120 A1* | 10/2020 | Preveraud | G06F 8/65 |
| 2021/0192869 A1 | 6/2021 | Conley | |
| 2021/0286693 A1 | 9/2021 | Alben et al. | |
| 2021/0307189 A1 | 9/2021 | Lucero et al. | |
| 2023/0116296 A1 | 4/2023 | Schneider et al. | |
| 2024/0184563 A1* | 6/2024 | Rajagopalan | G06F 8/656 |
| 2024/0275423 A1* | 8/2024 | Chou | H04B 1/401 |
| 2024/0289525 A1 | 8/2024 | Shanmugasundaram et al. | |
| 2025/0252062 A1 | 8/2025 | Levin et al. | |

FOREIGN PATENT DOCUMENTS

| | | |
|---|---|---|
| JP | 2004005331 A | 1/2004 |
| JP | 2005202705 A | 7/2005 |
| KR | 20070025994 | 3/2007 |
| WO | 2008068994 A1 | 6/2008 |
| WO | 2023064801 | 4/2023 |

OTHER PUBLICATIONS

"Final Office Action", U.S. Appl. No. 18/045,717, filed Aug. 20, 2025, 18 pages.
"Foreign Office Action", JP Application No. 2024-522111, Jun. 3, 2025, 4 pages.
"Notice of Allowance", U.S. Appl. No. 18/430,218, filed Aug. 19, 2025, 7 pages.
"Non-Final Office Action", U.S. Appl. No. 18/045,717, filed Feb. 13, 2025, 13 pages.
"Notice of Allowance", U.S. Appl. No. 18/045,717, filed Nov. 24, 2025, 8 pages.
"International Search Report and Written Opinion", Application No. PCT/US2022/077955, Feb. 6, 2023, 16 pages.
"Foreign Office Action", KR Application No. 10-2024-7013579, Jan. 30, 2026, 17 pages.
"Foreign Office Action", IN Application No. 202447031102, May 29, 2026, 7 pages.

* cited by examiner

ITERATIVELY EXECUTING SOFTWARE ON A HOST DEVICE WITH DIFFERENT ENABLED GROUPS OF PERIPHERALS

BACKGROUND

To make an electronic device product, the requirements of the device are first defined to provide capabilities, performance, security, and other requirements according to the desires of developers and users of the device. Hardware is then designed for the device by developing concepts for desired types of peripherals based on the device requirements. Software is developed based on the device requirements to work on the device hardware. The device developer may build a device prototype to verify the software works with the chosen peripherals and verify the device otherwise meets the requirements. The product development process is complex and can encounter many challenges.

SUMMARY

Techniques and apparatuses are described that implement software-defined hardware. In example aspects, a hardware manager can enable and disable different combinations of peripherals coupled to a host device. Software can be run on different enabled combinations of peripherals to determine which combinations best meet the requirements of a product. Combinations of peripherals can be updated with alternative or new peripherals that have new features or replace obsolete peripherals. Thus, the hardware manager can provide a modular validation platform that allows a manufacturer of electronic devices to skip a prototype phase, qualify new peripherals as replacements for existing peripherals that may become obsolete, and iterate between different combinations of peripherals to determine ideal combinations. The disclosed techniques and systems can therefore reduce resources, time, and costs associated with the design and testing phases of electronic devices.

Aspects described below include a method performed by a hardware manager for software-defined hardware. The method includes enabling a group of peripherals of a plurality of peripherals coupled to a host device, where the enabled group of peripherals corresponds to requirements of a product. The method also includes executing software on the host device with to support evaluation of the software with the enabled group of peripherals. The method additionally includes disabling a first peripheral of the enabled group of peripherals, where the disabled first peripheral has a peripheral type. The method further includes enabling a second peripheral of the plurality of peripherals, where the enabled second peripheral has a same peripheral type as the disabled first peripheral and corresponds to the requirements. The method also includes repeating execution of the software on the host device with the enabled second peripheral to support evaluation of the software with the enabled second peripheral.

Aspects described below also include a computing system comprising a memory coupled to a processor. The memory has instructions stored thereon that, responsive to execution by the processor, perform any one of the described methods.

Aspects described below also include a computer-readable storage medium comprising computer-executable instructions that, responsive to execution by a processor, cause a hardware manager to perform any one of the described methods.

Aspects described below additionally include a system with means for performing software-defined hardware.

BRIEF DESCRIPTION OF DRAWINGS

Apparatuses for and techniques for software-defined hardware are described with reference to the following drawings. The same numbers are used throughout the drawings to reference like features and components:

FIG. 6-1 is an example illustration of a system including a first enabled group of peripherals of a plurality of peripherals coupled to a host device;

FIG. 6-2 is an example illustration of a system including a second enabled group of peripherals of a plurality of peripherals coupled to a host device;

DETAILED DESCRIPTION

Figure 1:
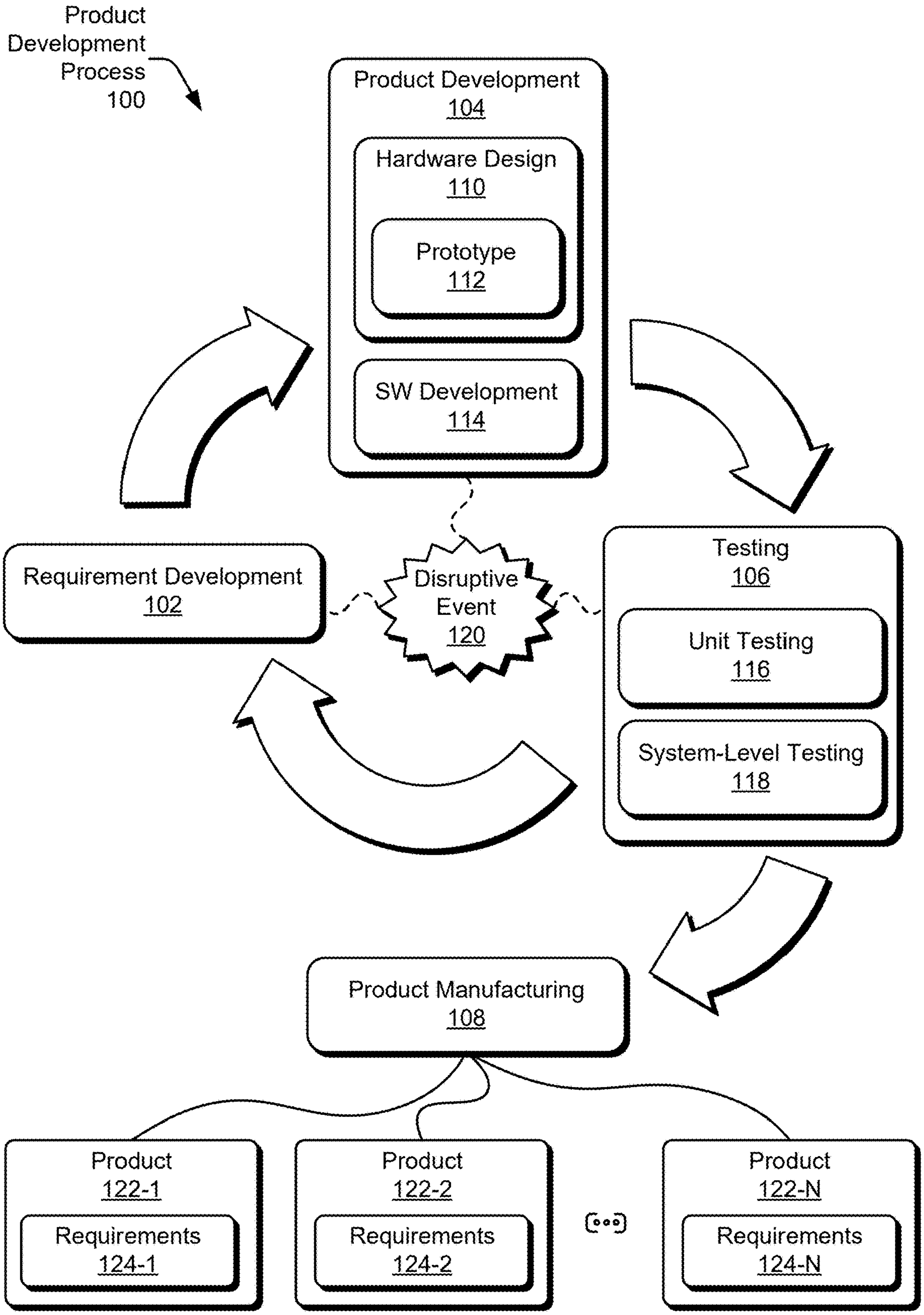
FIG. 1 illustrates an example environment of a product development process in which software-defined hardware can be implemented.

To make an electronic device product, the requirements of the device are first defined to provide capabilities, performance, security, and other requirements according to the desires of developers and users of the device. Hardware is then designed for the device by developing concepts for desired types of peripherals based on the device requirements. Software is developed based on the device requirements to work on the device hardware. The device developer may build a device prototype to verify the software works with the chosen peripherals and verify the device otherwise meets the requirements.

To build a prototype, the developer may select peripherals from many different models of a particular peripheral type of many different brands. For example, the developer may select between numerous different wireless chip brands and models, numerous different microcontroller brands and models, numerous different audio codec brands and models, and many other different peripherals of all the desired peripheral types. The developer may then connect and solder together all the different chosen peripherals to create the prototype.

Unfortunately, due to the multitude of combinations of peripheral types, peripheral brands, and peripheral models, it can be challenging to create and test a prototype for each combination of desired peripherals. The number of possible combinations results in an exorbitant number of prototypes, which requires an excessive amount of time and cost to build. Also, new versions of peripherals are often released, causing old peripherals to become obsolete. This makes it increasingly difficult to maintain a copy of every device that has been sold with every combination of peripherals for later debugging and testing when there is a device failure. It is therefore desirable to bypass the need to build a prototype during development and allow testing of devices that replace old peripherals with improved new peripherals.

To address this challenge, techniques are described that implement software-defined hardware. In general, software-defined hardware involves enabling and disabling peripherals coupled to a host device for different configurations of software. In example aspects, a hardware manager can enable and disable different combinations of peripherals coupled to a host device. Software can be run on different enabled combinations of peripherals to determine which combinations best meet the requirements of a product. Combinations of peripherals can be updated with alternative or new peripherals that have new features or replace obsolete peripherals. Thus, the hardware manager can provide a modular validation platform that allows a manufacturer of electronic devices to skip a prototype phase, qualify new peripherals as replacements for existing peripherals that may become obsolete, and iterate between different combinations of peripherals to determine ideal combinations. The disclosed techniques and systems can therefore reduce resources, time, and costs associated with the design and testing phases of electronic devices.

Operating Environment

FIG. 1 is an illustration of an example environment of a product development process 100 in which software-defined hardware can be implemented. The product development process 100 can include requirement development 102, product development 104, testing 106, and product manufacturing 108. During the requirement development 102, requirements of a particular product can be defined. These requirements can include a purpose, features, capabilities, functionality, performance, security, behavior, and other requirements of a product. The requirements can be prioritized based on factors, such as business value, use cases, and user feedback, and can serve as a guide for a technical team to build a product.

After the requirement development 102, the next step in the product development process 100 can be the product development 104. The product development 104 can include hardware design 110, which can involve researching and developing concepts for peripheral types and peripheral selection based on the product requirements.

A peripheral can be any operational electrical hardware that is part of an electronic device product. For example, a peripheral can be a hardware component that is typically soldered to a substrate that includes other soldered components. Hardware components can include integrated circuits, embedded controllers, microcontrollers, memory chips, wireless local area network (WLAN) chips, audio codec components, universal serial bus (USB) controllers, and other components that are soldered to a device. A peripheral can also be auxiliary hardware that can be inserted into a socket. Auxiliary hardware can include graphics processing units (GPUs), memory boards, central processing units (CPUs), Peripheral Component Interconnect (PCI) cards, and other auxiliary hardware that can be inserted into a socket. A peripheral can further be an accessory that can be plugged into a port. Accessories can include external hard drives, web cameras, memory sticks, memory card readers, USB hardware, and any other accessory that can be plugged into a port. Different models of the same peripheral type can provide options for soldering into a substrate, insertion into a socket, or connection to a port depending on the design of the peripheral.

Other example peripherals types can include computer hardware components, circuit boards, microprocessors, embedded controllers, digital signal processors (DSPs), microchips, communication controllers, display controllers, and power management circuits. Example peripheral types can also include internal hard drives, solid-state drives, optical drives, and other types of storage. Example peripheral types can additionally include network controllers and interfaces, such as wired, wireless, optical, and other network interfaces and controllers. Example networks can include personal area networks (PANs), short-range wireless networks, local area networks (LANs), WLANs, mesh networks, wide area networks (WANs), wireless wide area networks (WWANs), virtual private networks (VPNs), Internet protocol networks, global positioning system networks, and other networks. Example peripheral types can further include transceivers, displays, audio components (e.g., a speaker or a microphone), scanners, sensors (e.g., an inertial measurement unit (IMU) or a radar sensor), a global navigation satellite system (GNSS), amplifiers, filters, user interfaces, keyboards, touchpads, mice, power supplies, batteries, a wireless charging receiver, and any other peripheral that can be used with an electronic device.

Once the desired peripheral types are determined, makes and models of specific peripherals of each peripheral type can be selected to satisfy the requirements. For example, different makes and models from different vendors of a certain peripheral type may have different specifications. The specifications can include speed, size, cost, power consumption, and other specifications. The makes and models of specific peripherals with specifications that meet the requirements can be selected and assembled together to create a prototype 112.

The product development 104 can also include software development 114 (SW development 114), which can involve the development of system, programming, application, and embedded software based on the product requirements. Example software can include computer instructions, such as operating systems, disk management software, utilities, hardware management software, and other operational necessities. Other types of software can include firmware that controls hardware devices, such as by allowing hardware to interface with the computer instructions. Additionally or alternatively, the software can include compilers, linkers, debuggers, code creation tools, applications, programs, office productivity suites, word processing systems, text editors, data management software, media players, media editing systems, security programs, browsers, web applications, mobile applications, games, device control systems, and any other software.

After the product development 104, the next step in the product development process 100 can include the testing 106. Part of the testing 106 can include unit testing 116. During the unit testing 116, individual units or components of a software application or hardware can be verified to make sure they work as intended and meet lower-level requirements. The unit can be the smallest individual part of a software program, which can be a function, method, or component. With respect to hardware, the unit can include one of the peripherals.

Another part of the testing 106 can include system-level testing 118. During the system-level testing 118, the overall functionality of a complete and integrated software application and the hardware design 110 can be tested. The system-level testing 118 can be performed to make sure that the software application, as a whole, meets the specified requirements and functions correctly when operating on the prototype 112. Additionally, the system-level testing 118 can verify that a combination of peripherals can operate with a host device to meet the specified system-level requirements.

At any time or part of the product development process 100, a disruptive event 120 can occur. A disruptive event 120 can require a change in requirements, the hardware design 110, or software, which can require retesting. Some disruptive events 120 can be due to a natural development cycle (e.g., a bug in software code). Other disruptive events 120 can be due to parts no longer being available, due to new hardware being available, due to new technology being available, due to flaws in hardware, and so forth.

The requirements determined during the requirement development 102 can be refined through review and revisions based on the results of the testing 106 in response to disruptive events 120, and the product development process 100 can be repeated. For example, product requirements can change, different peripherals can be selected in the product development 104, and new prototypes 112 can be tested until the product is ready for manufacturing.

The product manufacturing 108 can begin after verification that the developed product meets the requirements and satisfies the testing 106. During the product manufacturing 108, products that satisfy the requirements and testing 106 can then be created and assembled as finished products for sale on a large scale. Different products 122-1 through 122-N can be manufactured to meet different requirements 124-1 through 124-N. According to a possible embodiment, a first product 122-1 may have a different use that requires different peripheral types to meet different requirements 124-1 than peripheral types that meet requirements 124-2 of a second product 122-2 that has a different use. For example, the first product 122-1 may be a game controller, the second product 122-2 may be a tablet computer, and a game controller may not require a display driver peripheral type that is required for a tablet computer. According to another possible embodiment, the first product 122-1 may be a similar product but may require different peripherals of the same type with different performance requirements than those of the second product 122-2. For example, the first product 122-1 may be a more powerful version of a smartphone than the second product 122-2 and may require higher-performance peripherals of the same type of peripherals in the second product 122-2. The first and second products 122-1 and 122-2 may also be associated with different costs.

Software-Defined Hardware

Figure 2:
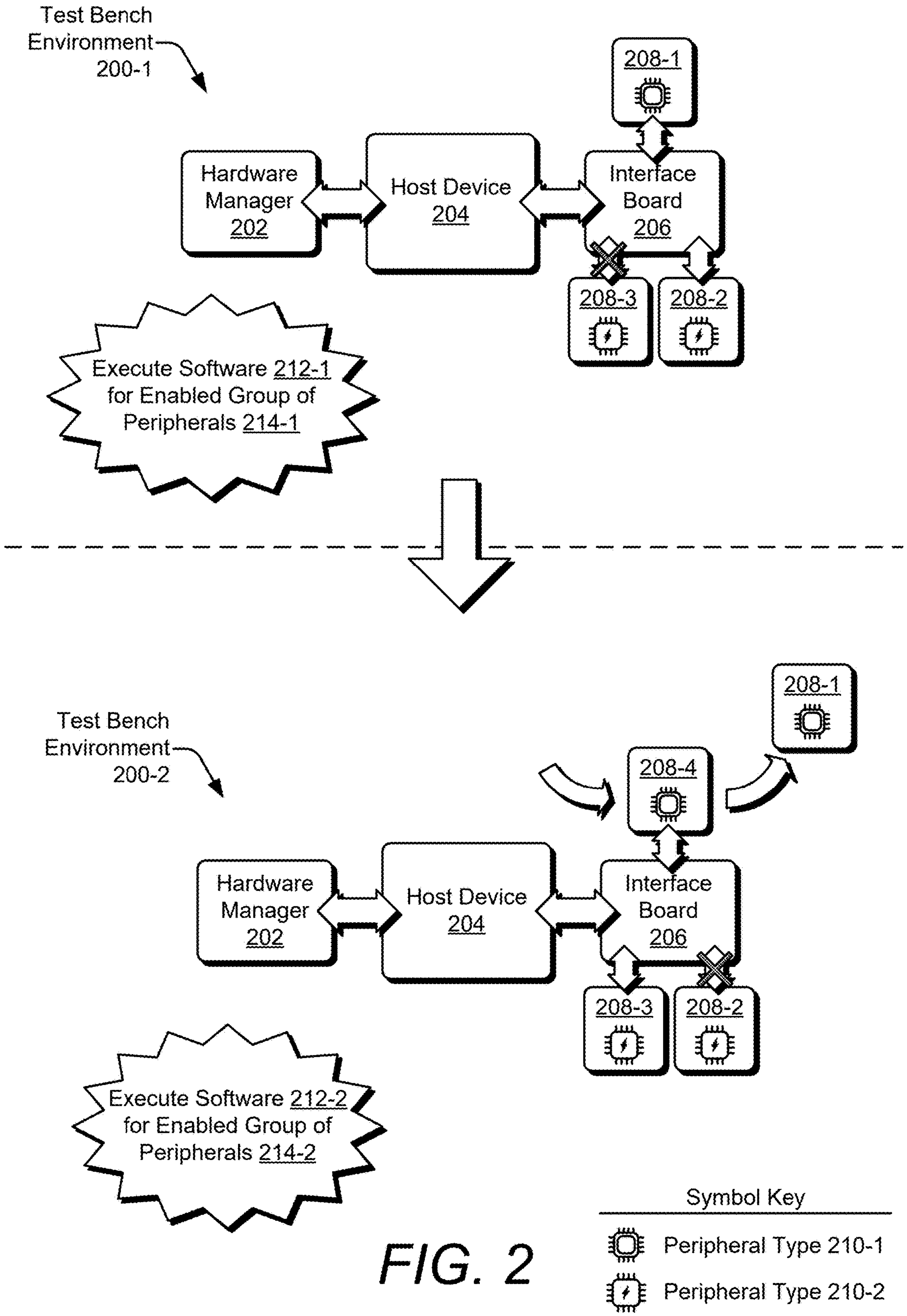
FIG. 2 illustrates an example change of enabled peripherals from a first test bench environment to a second test bench environment.

FIG. 2 illustrates an example change of enabled peripherals from a first test bench environment 200-1 to a second test bench environment 200-2. Each test bench environment 200-1 and 200-2 includes a hardware manager 202 coupled to a host device 204. The host device 204 represents a main or central operating unit of the prototype 112 and/or product 122 and is coupled to at least two peripherals 208. In general, the host device 204 can control or utilize information provided by the peripherals 208. The test bench environments 200-1 and 200-2 also include at least one interface board 206, which is coupled to the host device 204. The interface board 206 enables multiple peripherals 208-1 through 208-4 of peripheral types 210-1 and 210-2 to be coupled to the host device 204. In general, the hardware manager 202 controls a configuration of the interface board 206. The hardware manager 202 can also initiate testing of software to support the software development 114 and/or the testing 106 in the product development process 100.

In the first test bench environment 200-1, a first peripheral 208-1 of a first peripheral type 210-1 can be coupled to the interface board 206 and enabled by the hardware manager 202. A second peripheral 208-2 and a third peripheral 208-3, both of a same second peripheral type 210-2, can be coupled to the interface board 206, but only the second peripheral 208-2 may be enabled by the hardware manager 202. The hardware manager 202 can initiate execution of software 212-1 on the host device 204 to test a first enabled group of peripherals 214-1 in the first test bench environment 200-1. The first enabled group of peripherals 214-1 includes the first and second peripherals 208-1 and 208-2.

In the second test bench environment 200-2, the first peripheral 208-1 can be removed and replaced with a fourth peripheral 208-4 of the same peripheral type 210-1 and the fourth peripheral 208-4 can be enabled by the hardware manager 202. The second peripheral 208-2 of the peripheral type 210-2 can be disabled by the hardware manager 202 and the third peripheral 208-3 of the same peripheral type 210-2 can be enabled by the hardware manager 202 while both peripherals 208-2 and 208-3 are still connected to the interface board 206. The hardware manager 202 can then initiate execution of software 212-2 to test a second enabled group of peripherals 214-2 in the second test bench environment 200-2. The second enabled group of peripherals 214-2 includes the third and fourth peripherals 208-3 and 208-4. In this manner, software 212 can be executed on various combinations of peripherals 208 to develop a product 122 without requiring the assembly of numerous different prototypes 112. The hardware manager 202, host device 204, interface board 206, and peripherals 208 are further described with respect to FIG. 3.

Figure 3:
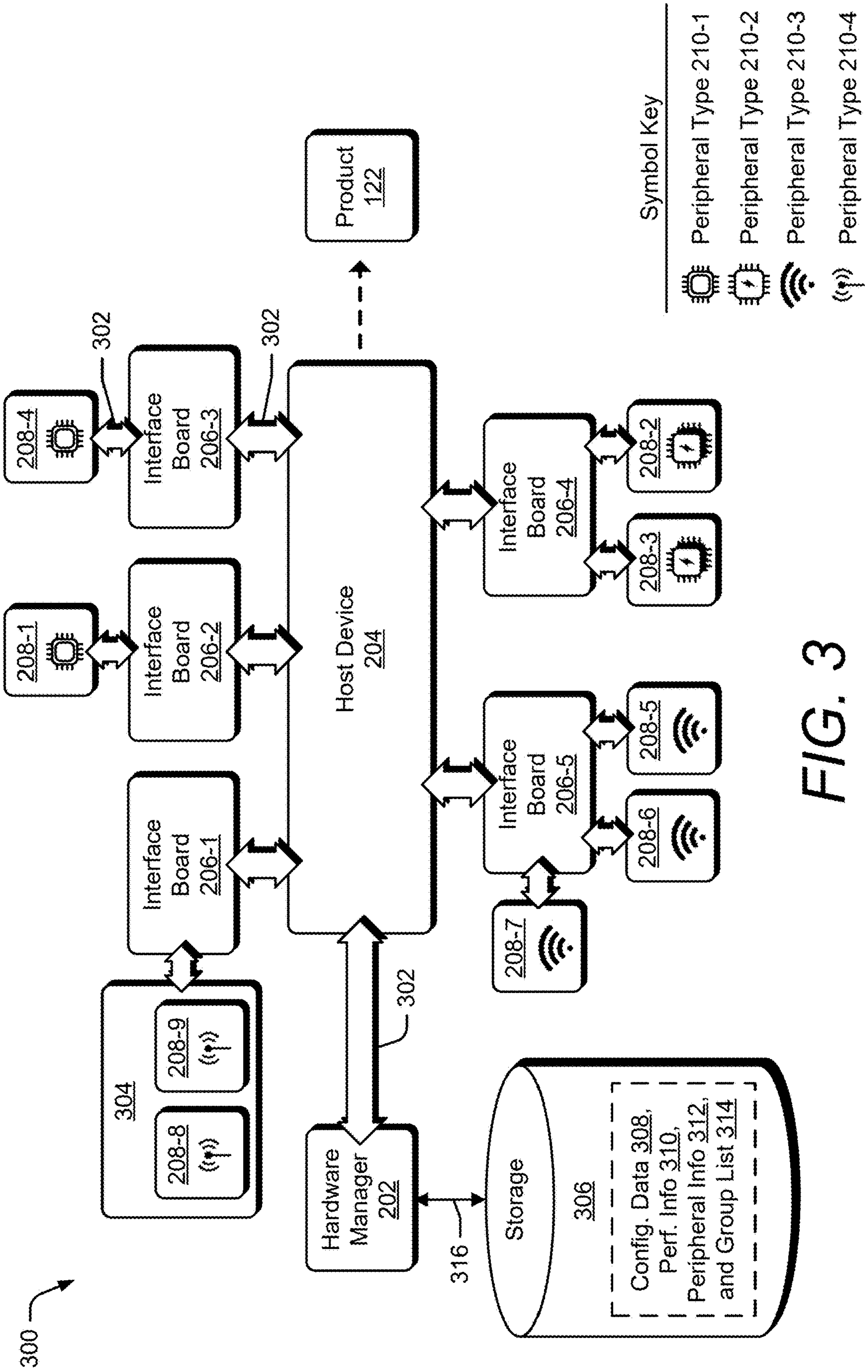
FIG. 3 illustrates an example system with a hardware manager that enables different peripherals for software-defined hardware.

FIG. 3 illustrates an example system 300 with the hardware manager 202 that enables different peripherals 208 for software-defined hardware based on requirements of a product 122-1. In the depicted configuration, the system 300 includes multiple interface boards 206-1 to 206-5, which can couple peripherals 208-1 to 208-9 to the host device 204. The peripherals 208-1 to 208-9 can represent different peripheral types 210-1 to 210-4. In this example, the peripheral type 210-1 represents a processor, the peripheral type 210-2 represents a power management circuit, the peripheral type 210-3 represents a WLAN chip, and the peripheral type 210-4 represents a cellular communications board. By appropriately configuring the interface boards 206-1 to 206-5, the hardware manager 202 can readily enable different combinations of the peripherals 208-1 to 208-9 to support the product development process 100.

The hardware manager 202, the host device 204, the interface boards 206, and the peripherals 208 can be coupled to each other via interconnects 302. The interconnects 302 can include predefined connectors, common connectors, particular types of connectors, USB-type connectors, PCIe connectors, Ethernet connectors, and/or any other connectors depending on the implementation of the system 300. Additionally or alternatively, the interconnects 302 can include connector interfaces that can include conductors for predefined input/output (I/O) signal ports, one or more power rails, and/or control lines that enable the hardware manager 202 to control or configure circuitry of the interface boards 206. Other types of interconnects 302 can include physical connectors on the hardware manager 202, on the host device 204, on the interface boards 206, and on the peripherals 208. The interconnects 302 can also include any facility for electronic communication including, but not limited to, a bus, a crossbar, a fabric, a switching fabric, a grid, one or more wires that carry electronic signals, one or more wires that carry power, voltage, and/or current signals, a network, wired network interfaces, wireless network interfaces, and/or any other interconnects that can couple devices, boards, circuits, and other electronic elements to each other.

The hardware manager 202 can be implemented as hardware, software, or a combination thereof. While the hardware manager 202 is shown as a single manager, the hardware manager 202 can also be separate hardware managers that can perform similar or different functions. For example, the hardware manager 202 can include one or more dedicated hardware circuits and/or can be software stored on computer-readable media. One or multiple hardware managers 202 can be directly coupled to the interface boards 206, distributed throughout the system 300, and/or remotely coupled to the system 300, such as via a network. In some aspects, the hardware manager 202 can be a printed circuit board (PCB) coupled to the host device 204. In other aspects, the hardware manager 202 can be an integrated circuit (IC) and other circuitry included on the host device 204.

In operation, the hardware manager 202 can enable and disable peripherals 208 and can evaluate performance of the system 300 based on a currently enabled group of peripherals 214. In aspects, the system 300 can be a modular system validation platform for electronic devices and the hardware manager 202 can control configuration and reconfiguration of the system 300. For example, the hardware manager 202 can determine or select respective configuration information to provide configurations of one or more interface boards 206. In some cases, the hardware manager 202 also includes or manages a power source that powers a control plane for configuration aspects of any boards and peripherals included in the system 300. The control plane can include circuitry that powers and communicates with board management logic on the host device 204, the interface boards 206, and the peripherals 208. The hardware manager 202 can use the control plane to configure the system 300 independent of functional circuitry being tested.

The host device 204 can be a host board, a PCB without any circuitry, a PCB with basic circuitry, a breadboard, or a substrate and/or can be any other device that can host and distribute power and signals to and between peripherals 208, as well as receive power and signals from peripherals 208. The host device 204 can also include foundation circuitry, such as a bus, a power supply, a power connector, sockets, storage controllers, ports, a basic input/output system (BIOS), a microprocessor, a clock circuit, expansion slots, and/or other circuitry that can provide basic operations for a host device. Some or all of the foundation circuitry can also be provided by peripherals 208 coupled to the host device 204, where the foundation circuitry can be enabled and disabled for different iterations of execution of software. In possible implementations, the host device 204 can include a system on a chip (SoC), a processor IC, a memory IC, a power system, power system Ics, memory, control circuitry, and/or other components of an electronic device with or without peripherals. In some aspects, the host device 204 may represent a core platform of a particular processor or SoC manufacturer.

Generally, the interface boards 206 can include reconfigurable interface circuitry designed to interface the host device 204 to one or more peripherals 208. For example, the interface boards 206 can include circuitry that can be reconfigured to enable different peripherals 208 using the same interface board 206 to operate with the host device 204. The interface boards 206 can also include circuitry that allows the hardware manager 202 to monitor the power and communication signals that are being interfaced between the host device 204 and the peripherals 208. In some implementations, the circuitry of the interface boards 206 can enable configuration and/or monitoring of electrical nets, nodes, or paths (e.g. signal lines or power rails on internal PCB layers) that are not exposed on external layers or contacts (e.g., test points or connector headers) of the interface boards 206 or peripherals 208. The interface boards 206 can further include enhanced yet predefined interfaces, which may include standardized data interfaces and additional sideband signaling, such as for configuration of the interface boards 206. Thus, the interface boards 206 can enable control (e.g., level shifting or power sequencing) and measurements of electrical signals that are not typically exposed by preceding host devices, peripherals, or adapter boards.

The interface boards 206 can provide power measurements on power rails for individual components as opposed to a summary measurement over a batch of components. Likewise, the interface boards 206 can enable analog monitoring of logical signals to attached peripherals 208 to confirm expected behavior or monitor for voltage or current leakage issues. The electrical paths or nets of the interface boards 206 being measured or monitored may not be exposed on external layers or contacts of the interface boards 206. For example, test headers, leads, pads, or additional test equipment may not be needed to debug or characterize electrical interfaces between the host device 204 and the peripherals 208. Alternatively or additionally, some interface boards 206 can provide novel peripheral interfaces by combining multiple existing peripheral connectors into a single board.

In some aspects, the interface boards 206 can include multiple connectors (e.g., with multiplexed power and/or signaling) to interface multiple peripherals 208 with the host device 204. For example, the interface boards 206 can include multiplexing circuitry (or switching circuitry) that allow disabling and enabling of different peripherals 208 by switching a signal path between the host device 204 and the different peripherals 208.

The system 300 can enable an interchange of different host devices 204 and an interchange of different peripherals 208 using the same set of interface boards 206. Further, the interface boards 206 and peripherals 208 can be added, removed, or swapped (e.g., hot-swapped while the host device 204 is powered) to rapidly test and evaluate (compared to traditional reference platforms) different configurations of an electronic device modeled by the system 300.

At least some of the peripherals 208 can be detachably coupled to the host device 204 via the interface boards 206, such as via user-detachable connectors that can be connected and disconnected with a user's hands or using a simple tool (e.g., without requiring soldering). While the peripherals 208 may be detachably coupled to the host device 204, at least some of the peripherals 208 may be fixed to an intermediary device, such as soldered to a peripheral board 304, such as a PCB, that includes or is attached to an interface board 206-1. In this example, one or more peripherals 208-8 and 208-9 can be cellular communication chipsets from different manufacturers mounted on a single peripheral board 304. Multiplexing circuitry, cither on the attached interface board 206-1 or on the peripheral board 304, can be implemented to switch between the different cellular communication chipsets 208-8 and 208-9 during testing.

The peripherals 208 can also include some peripherals fixedly coupled to the host device 204, such as soldered or directly socketed onto a PCB, and at least one peripheral of the same type detachably coupled to the host device 204, such as via an interface board 206. The peripherals 208 can additionally include some peripherals locally coupled to the host device 204 and other peripherals remotely coupled to the host device 204. For example, locally coupled peripherals can be proximate to the host device 204 in a common housing, on a same table, or otherwise locally coupled, and remote peripherals can be exterior to the housing but on the same table, can be in a cabinet, can be in a drawer, can be in a closet, can be in another room, can be in another building, or can be otherwise relatively remote to the host device 204. Thus, remotely coupled peripherals can be relatively remote when compared to locally coupled peripherals. In some instances, some peripherals can be coupled to the host device 204 via interface circuitry 206 and the other peripherals may not be coupled to the host device 204 via the interface circuitry 206.

The system 300 can include storage 306 that stores data and applications that can be accessed 316 by the hardware manager 202. The storage 306 can be local or remote storage that can provide persistent and/or non-transitory data storage, which can be in contrast to mere signal transmission). For example, the storage 306 can be one or more of, and/or a combination of any of, a computer-readable medium, one or more memory devices, random access memory (RAM), non-volatile memory (e.g., any one or more of a read-only memory (ROM), flash memory, EPROM, EEPROM, etc.), a disk storage device, a magnetic storage device, an optical storage device, a hard disk drive, a recordable and/or rewriteable compact disc (CD), any type of a digital versatile disc (DVD), a mass storage medium device (storage medium), a networked storage device, cloud storage, and/or any other type of storage.

The storage 306 can store configuration data 308 (config. data 308), performance information 310 (perf. info 310), peripheral information 312 (peripheral info 312), and lists of groups of peripherals 314 (group list 314). The storage 306 can also store system data, device applications, an operating system, control applications, software applications, signal-processing code, control module code, code that is native to a particular device, a hardware abstraction layer for a particular device, other types of information and software, and/or combinations thereof related to operational aspects of the system 300.

In operation, the hardware manager 202 can enable a first group of peripherals 214-1 of the plurality of peripherals 208 coupled to the host device 204. The first enabled group of peripherals 214-1 can include the first peripheral 208-1 having the first peripheral type 210-1. The peripherals 208 that are enabled as part of the first enabled group of peripherals 214-1 can correspond to requirements of a product 122. In general, a peripheral 208 can correspond to the requirements if the peripheral 208 can satisfy the requirements of the product 122. In some examples, the requirements can be used to determine which peripherals 208 can be enabled for the testing 106.

The hardware manager 202 can initiate execution of the software 212 on the host device 204 with the enabled first group of peripherals 214-1. In general, the execution of the software 212 involves operating the enabled first group of peripherals 214-1 in a manner that provides power to the first group of peripherals 214-1 and/or passing communication signals between the host device 204 and peripherals 208 within the first group of peripherals 214-1. As discussed above, the software 212 can be computer instructions, such as an operating system, an application, a program, a browser, a word processing system, a game, a media player application, a media editing program, or any other software. The software 212 can also be firmware that controls hardware devices, such as by allowing hardware to interface with the computer instructions.

The hardware manager 202 can enable a second group of peripherals 214-2, which can also correspond to the requirements of the product 122. The second group of peripherals 214-2 does not include the first peripheral 208-1 but includes another peripheral 208 having a same peripheral type 210 as the first peripheral 208-1. In this example, the other peripheral 208 is represented by the fourth peripheral 208-4, which has the first peripheral type 210-1. To transition from the enabled first group of peripherals 214-1 to the enabled second group of peripherals 214-2, the hardware manager 202 disables the first peripheral 208-1 of the first group of peripherals 214-1 and enables the fourth peripheral 208-4 of the second group of peripherals 214-2. The fourth peripheral 208-4 can correspond to the requirements of the product 122. The hardware manager 202 can repeat initiation of the execution of the software 212 on the host device 204 with the enabled fourth peripheral 208-4. According to a possible embodiment, the hardware manager 202 can iteratively initiate execution of the software 212 with different enabled groups of peripherals 214. The different enabled groups of peripherals 214 can include at least one different peripheral 208 of the same peripheral type 210.

The hardware manager 202 can then evaluate performance information 310 corresponding to operation of the host device 204 with the different enabled groups of peripherals 214 while iteratively executing the software 212. For example, the hardware manager 202 can determine the performance information 310 from signals received from the interface boards 206. The hardware manager 202 can store 316 the performance information 310 in the storage 306 each time the software 212 is executed. The hardware manager 202 can then compare the performance information 310 from execution of the software 212 on the different groups of peripherals 214.

At least some of the different enabled groups of peripherals 214 can include different peripherals 208 of different peripheral types 210. The hardware manager 202 can store 316 a list of groups of peripherals 314 that meet the requirements based on the performance information 310. For example, the hardware manager 202 can be configured to iterate through different subsets of the peripherals 208 to determine a catalog/list of subsets of peripherals 208 that meet desired specifications and features for the product 122 based on specifications and features desired for the product 122.

The process can be repeated multiple times for different peripherals 208 of a same type 210. The process can also be repeated multiple times for different peripherals 208 of different types 210. For example, a list of groups of peripherals 314 that satisfy the specification for the product 122 can be determined by iterating through enabling different groups of peripherals 214 to determine, based on specifications and features desired for the consumer product 122, a list of groups, such as a catalog of subsets, of peripherals 208 that meet the desired specifications and features for the consumer product 122.

In some implementations, a peripheral 208 that satisfies the specification for the product 122 can be determined as a replacement for at least one of the peripherals 208. Also, different peripherals 208 of different types 210 can be enabled and disabled at the same time or at different times. For example, only one peripheral 208 of one peripheral type 210 may be changed at a time each time the software 212 is executed. Alternatively, multiple peripherals 208 of different types 210 can be changed in between subsequent executions of the software 212. In either event, one or multiple peripherals 208 can be switched out for each execution of the software 212.

The hardware manager 202 can selectively distribute, via interface circuitry, such as circuitry on the interface boards 206, signaling between the host device 204 and enabled and disabled peripherals 208. The signaling can be communication signaling and/or power signaling. The hardware manager 202 can thus enable peripherals 208 by altering at least one operating characteristic of interface circuitry on the interface boards 206 to enable operation of peripherals 208 with the host device 204. Altering at least one operating characteristic of the interface circuitry can include switching a signal path between the host device 204 and one peripheral 208 to a signal path between the host device 204 and another peripheral 208 via multiplexing to disable the one peripheral 208 and enable the other peripheral 208. For example, the interface boards 206 and the peripheral board 304 can include multiplexing circuitry, where the peripheral 208-8 is disabled and the peripheral 208-9 is enabled by switching a signal path between the host device 204 and the peripheral 208-8 to a signal path between the host device 204 and the peripheral 208-9 using the multiplexing circuitry. The hardware manager 202 can program the multiplexing circuitry to switch the signal path via software selection of a subset of the peripherals 208.

According to a possible embodiment, the hardware manager 202 can store 316 peripheral information 312 in the storage 306. The peripheral information 312 can correspond to the plurality of peripherals 208 coupled to the host device 204. The hardware manager 202 can determine a replacement peripheral 208 has replaced a removed peripheral 208 that is no longer coupled to the host device 204. The hardware manager 202 can update the stored peripheral information 312 in the storage 306 based on determining the replacement peripheral 208 has replaced the removed peripheral 208.

To determine which peripherals 208 are connected to the host device 204 via the interface boards 206, the hardware manager 202 can query all of the peripherals 208 or query a subset of the peripherals 208 upon startup, at regular intervals, at predetermined intervals, in response to an event, or at any other time. The hardware manager 202 can also detect a new peripheral 208 has been coupled to the host device 204 and can query the new peripheral 208 for identifying information, operation information, performance information, and other information. According to a possible embodiment, the hardware manager 202 can separately retrieve operation, performance, and/or other information, such as from the storage 306, based on identifying information received from a given peripheral 208. This can help the hardware manager 202 learn which peripherals 208 are connected to the host device 204.

According to a possible embodiment, the hardware manager 202 can receive configuration data 308 for the product 122. For example, the hardware manager 202 can receive the configuration data 308 from the storage 306 or otherwise receive the configuration data 308 for the product 122. The configuration data 308 can include the requirements of the product 122. The hardware manager 202 can select a group of peripherals 214 from the plurality of peripherals 208 based on the requirements. The hardware manager 202 can enable the selected group of peripherals 214 for the software development 114 and/or the testing 106. The hardware manager 202 can iterate between initiating execution of software 212 on different groups of peripherals 214 to determine a combination of peripherals 208 that best meets the product requirements. A final product 122 can then be built and sold based on the determined combination of peripherals 208 that best meets the product requirements.

Thus, the hardware manager 202 can initiate execution of software 212 on various combinations of peripherals 208 corresponding to different products 122. This can avoid resources, time, and costs associated with building numerous prototypes and executing various software on numerous prototypes of various redesigns of potential products. This can also avoid the need to store models of every product ever sold for testing issues that arise after the products have been released.

Once design and testing of the system 300 are complete and a group of peripherals 214 has been selected that satisfies the product requirements, the corresponding configuration data 308 can be used to generate schematics of an electronic device as an end product 122 by replacing the interface board 206 with the hardware schematic. An example of an end product 122 is further described with respect to FIG. 4.

Figure 4:
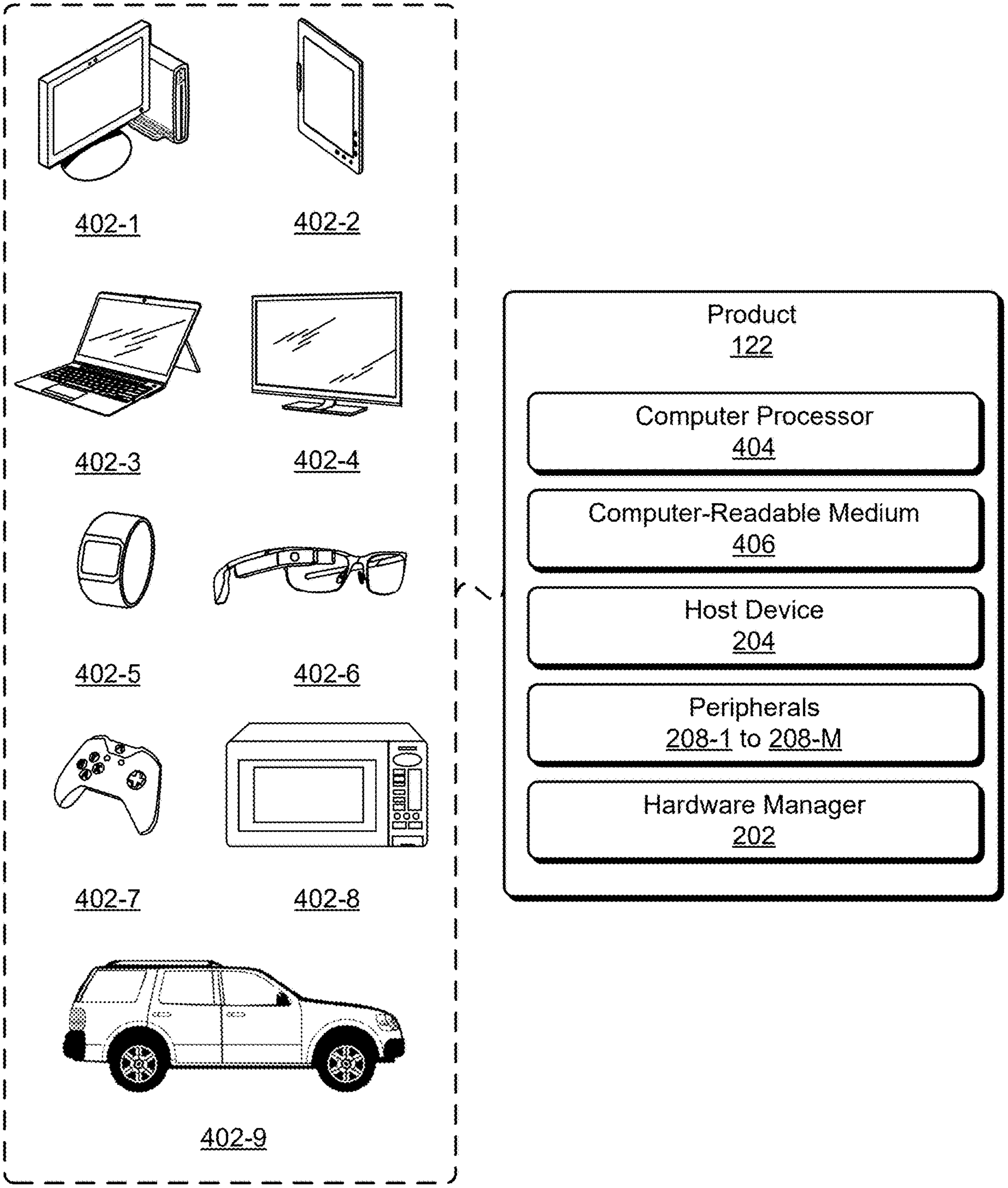
FIG. 4 illustrates an example implementation of a product that can incorporate aspects of software-defined hardware.

FIG. 4 illustrates an example implementation of a product 122 that can incorporate aspects of software-defined hardware. The product 122 is illustrated with various non-limiting example devices including a desktop computer 402-1, a tablet 402-2, a laptop 402-3, a television 402-4, a computing watch 402-5, computing glasses 402-6, a gaming system 402-7, a microwave 402-8, and a vehicle 402-9. Other devices may also be a product 122, such as a home service device, a smart speaker, a smart thermostat, a baby monitor, a Wi-Fi™ router, a drone, a trackpad, a drawing pad, a netbook, an electronic reader, a home automation and control system, a wall display, a home appliance, or any other electronic device.

The product 122 can include one or more computer processors 404 and at least one computer-readable medium 406 that includes software and data. Applications and/or an operating system embodied as computer-readable instructions on the computer-readable medium 406 can be executed by the computer processor 402 to provide some of the functionalities described herein.

The product 122 can also include the host device 204, a group of the peripherals 208-1 to 208-M, and the hardware manager 202. The variable M represents a positive integer. The product 122 can be the result of the host device 204 combined with a chosen group of peripherals 208-1 to 208-M that best meets the product requirements. The hardware manager 202 can also be included with the product 122 to provide for future testing and debugging. An example implementation of the hardware manager 202 is further described with respect to FIG. 5.

Figure 5:
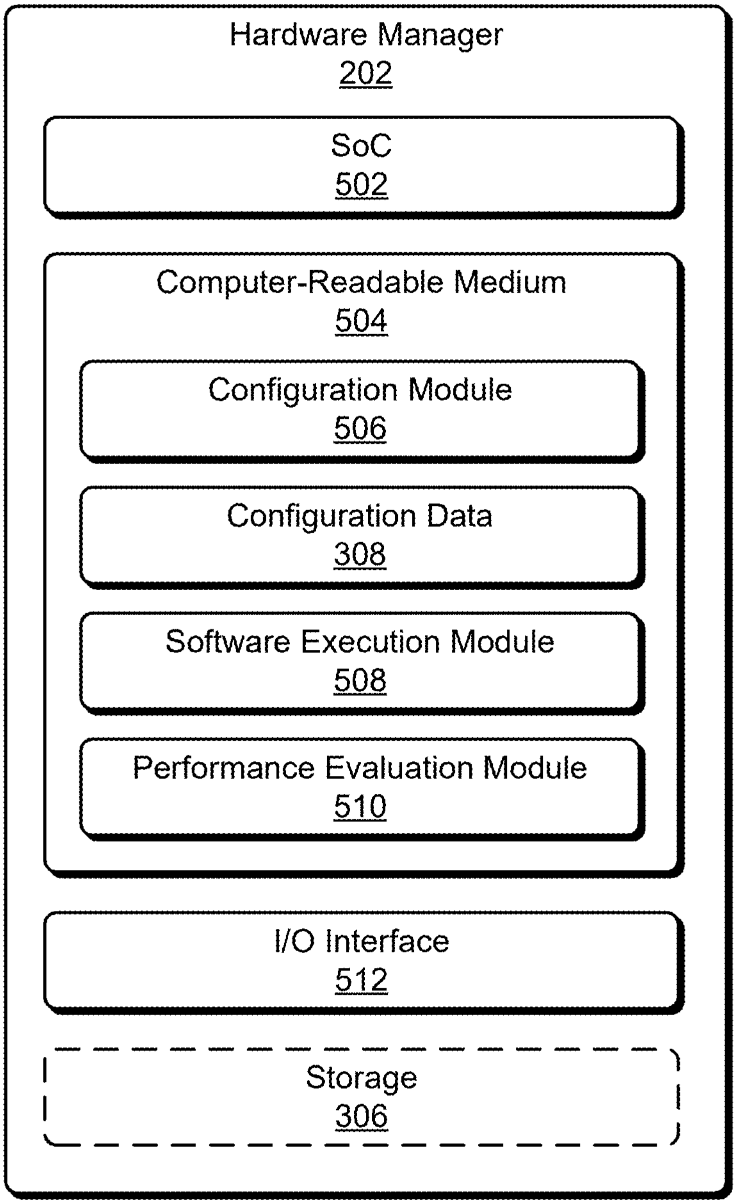
FIG. 5 illustrates an example hardware manager that implements software-defined hardware.

FIG. 5 illustrates an example hardware manager 202 that implements software-defined hardware. The hardware manager 202 can include an SoC 502, which can also be considered a processor, a controller, and the like and can process various computer-executable instructions to control the operation of the hardware manager 202. Alternatively or in addition, the hardware manager 202 can be implemented with any one or combination of hardware, firmware, or fixed logic circuitry that is implemented in connection with processing and control circuits. In some implementations, the SoC 502 can be a single processor that can perform all of the operations. In other implementations, the SoC 502 can be multiple processors that may be local on the hardware manager 202 or distributed throughout a system 300. For example, a hardware manager processor can enable and disable peripherals 208 and/or groups of peripherals 214, a host device processor can initiate execution of software 212 on a host device 204, and a debug bridge module can evaluate performance information 310 corresponding to operation of the host device 204. Although not shown, the hardware manager 202 can include a system bus or data transfer system that couples the various components within a device. A system bus can include any one or combination of different bus structures, such as a memory bus or memory controller, a peripheral bus, a universal serial bus, and/or a processor or local bus that utilizes any of a variety of bus architectures.

The hardware manager 202 can also include a computer-readable medium 504. The computer-readable medium 504 can be one or more memory devices that enable persistent and/or non-transitory data storage (i.e., in contrast to mere signal transmission), examples of which include RAM, non-volatile memory (e.g., any one or more of a ROM, flash memory, EPROM, EEPROM, etc.), a disk storage device, an external storage, cloud storage, and/or any other computer-readable medium. The disk storage device may be implemented as any type of magnetic or optical storage device, such as a hard disk drive, a recordable and/or rewriteable CD, any type of a DVD, and the like. The hardware manager 202 can optionally also include a storage 306.

The computer-readable medium 504 provides data storage mechanisms to store device data, software, an operating system, various device applications, firmware, device managers, signal processing, control applications, control modules, a hardware abstraction layer for the hardware manager 202, and any other types of software, information, and/or data related to the hardware manager 202. Stored applications and data can include a configuration module 506 for configuring the system 300, configuration data 308 for configuring the system 300, a software execution module 508 for initiating execution of the software 212, and a performance evaluation module 510 for developing and/or testing a product 122.

An I/O interface 512 can provide an interface for interconnects, a user input interface, a data transfer interface, a wired network interface, a wireless network interface, a power interface, and/or any other interface for input signals, output signals, power signals, and other signals. The configuration module 506, the configuration data 308, the software execution module 508, the performance evaluation module 510, other aspects of the hardware manager 202, and other elements can also be stored on the storage 306, implemented as circuitry, implemented as logic, and/or implemented as other hardware and/or software for enabling software-defined hardware.

In certain aspects, the configuration module 506, software execution module 508, and performance evaluation module 510 can include instructions that, when executed by the SoC 502, perform operations corresponding to the respective modules. For example, the configuration module 506 can include instructions that, when executed by the SoC 502, boot up a control plane of the system 300 for software-defined hardware and enable the configuration module 506 to detect and identify the host device 204, interface boards 206, and peripherals 208 that are a part of the system 300 for software-defined hardware. Instructions included on the configuration module 506, when executed by the SoC 502, can also configure the interface boards 206 (e.g., configure level shifters, power sequencers, and load switches) to provide power from the host device 204 to the peripherals 208 and establish communication between the host device 204 and the peripherals 208. Other instructions on the configuration module 506 can provide for monitoring the power and communications between the host device 204, the interface boards 206, and the peripherals 208. The configuration module 506 can likewise enable reconfiguration of the interface boards 206. For example, the configuration module 506 can enable peripherals 208, disable peripherals 208, distribute signaling, alter operating characteristics of the interface boards 206, query peripherals 208, and perform other configuration operations for the system 300.

The configuration data 308 can provide information and data used by the configuration module 506. For example, the configuration data 308 can include requirements of a product 122, can include identities of the expected host device 204, the expected interface boards 206 attached to the host device 204, and the expected peripherals 208 attached to the interface boards 206, and can include other configuration data. In some aspects, the identities of the expected host device 204, interface boards 206, and peripherals 208 are stored as a digital identification code. The configuration data 308 can also include the power and communication requirements of each peripheral 208 that may be coupled to the system 300. These requirements may be in the form of specific configurations for components (e.g., level shifters, power sequencers, load switches) present on the interface board 206 that provide the peripherals 208 with the required power and communication connections. One or more distinct configurations of each interface board 206 (or other aspects of interface boards, including peripheral-specific interface boards) stored as configuration data 308 can be represented as a hardware schematic. Once design and testing of the system 300 are complete, the configuration data 308 can be used to generate schematics of an electronic device as an end product 122-1 by replacing the interface boards 206 with the hardware schematic. The hardware schematic can exclude any circuitry on the interface boards 206 that is not used for power and communication considerations of enabled peripherals 214and can exclude any circuitry corresponding to disabled peripherals that were not selected for the end product 122. Therefore, the schematics of the final design may only include circuitry that is needed to couple core components of the host device 204 to a selected group of peripherals 214. Some specific examples of other data that may be included in the configuration data 308 include a preferred voltage for multi-voltage I/O signals, a preferred isolation for some I/Os, preferred general-purpose I/Os (GPIOs) to control power for the peripherals, and a preferred configuration to use when multiple options are available for certain peripherals.

In operation according to a possible embodiment, the SoC 502 can be a processor and the computer-readable medium 504 can be a memory coupled to the processor, the memory having instructions stored thereon that, responsive to execution by the processor, perform operations of the modules and other operations. In particular, the configuration module 506 can enable a group of peripherals 214 of the plurality of peripherals 208 coupled to the host device 204, where the enabled group of peripherals 214 can correspond to requirements of a product. The product requirements can be received from the configuration data 308, received via the I/O interface 512, or otherwise obtained. The software execution module 508 can initiate execution of the software 212 on the host device 204 with a first enabled group of peripherals 214-1. The configuration module 506 can disable a first peripheral 208-1 of the first enabled group of peripherals 214-1, where the disabled first peripheral 208-1 can have a peripheral type 210-1. The configuration module 506 can enable a fourth peripheral 208-4 of the plurality of peripherals 208, where the enabled fourth peripheral 208-4 can have the same peripheral type 210-1 as the disabled first peripheral 208-1 and can correspond to the requirements. The software execution module 508 can repeat initiating execution of the software 212 on the host device 204 with the enabled fourth peripheral 208-4. In this case, the enabled group of peripherals 214 corresponds to a second enabled group of peripherals 214-2.

According to a possible implementation, the software execution module 508 can iteratively initiate execution of the software 212 with different enabled groups of peripherals 214, where different enabled groups of peripherals 214 can include at least one different peripheral 208 of a same peripheral type 210. The performance evaluation module 510 can evaluate performance information 310 corresponding to operation of the host device 204 with the different enabled groups of peripherals 214 while iteratively executing the software 212.

According to a possible implementation, the configuration module 506 can disable a second peripheral 208-2, which was previously enabled as part of the first enabled group of peripherals 214-1. The disabled second peripheral 208-2 has a different peripheral type 210 than the first peripheral 208-1. More specifically, the second peripheral 208-2 has a second peripheral type 210-2. The configuration module 506 can enable a third peripheral 208-3 of the plurality of peripherals 208. The enabled third peripheral 208-3 has a same peripheral type 210 as the disabled second peripheral 208-2 and corresponds to the requirements. The software execution module 508 can repeat initiating execution of the software 212 on the host device 204 with the enabled third peripheral 208-3 and the enabled fourth peripheral 208-4, which are part of the second enabled group of peripherals 214-2. Thus, the configuration module 506 can enable and disable various groups of peripherals 214 for performance evaluation 310 during execution of the software 212. At least some of the different enabled groups of peripherals 214 can include different peripherals 208 of different peripheral types 210, and the performance evaluation module 510 can store a list of groups of peripherals 314 in the storage 306 when the groups of peripherals 214 meet the requirements based on the performance information 310.

The configuration module 506 can enable and disable peripherals 208 by altering at least one operating characteristic of interface circuitry of the interface boards 206 that is coupled between the host device 204 and the peripherals 208, where the altering enables operation of peripherals 208 with the host device 204. For example, the interface circuitry can include multiplexing circuitry, and peripherals 208 can be enabled and disabled by switching from a signal path between the host device 204 and one peripheral 208 to a signal path between the host device 204 and another peripheral 208 using the multiplexing circuitry. The multiplexing circuitry can allow for selection and routing of multiple analog and/or digital signals to different destinations. According to a possible embodiment, n-Pole Double Throw (nPDT) multiplexing circuitry can switch multiple signals between different paths by controlling multiple independent circuits simultaneously. Other circuitry, such as multiple switches and/or other multiplexing circuitry, can also be used to switch multiple input channels to different output paths simultaneously to effectively enable and disable different peripherals. The hardware manager 202 facilitates development and/or testing of hardware and software during a product development process 100, as further described with respect to FIGS. 6-1 and 6-2.

Figures 1, 6:
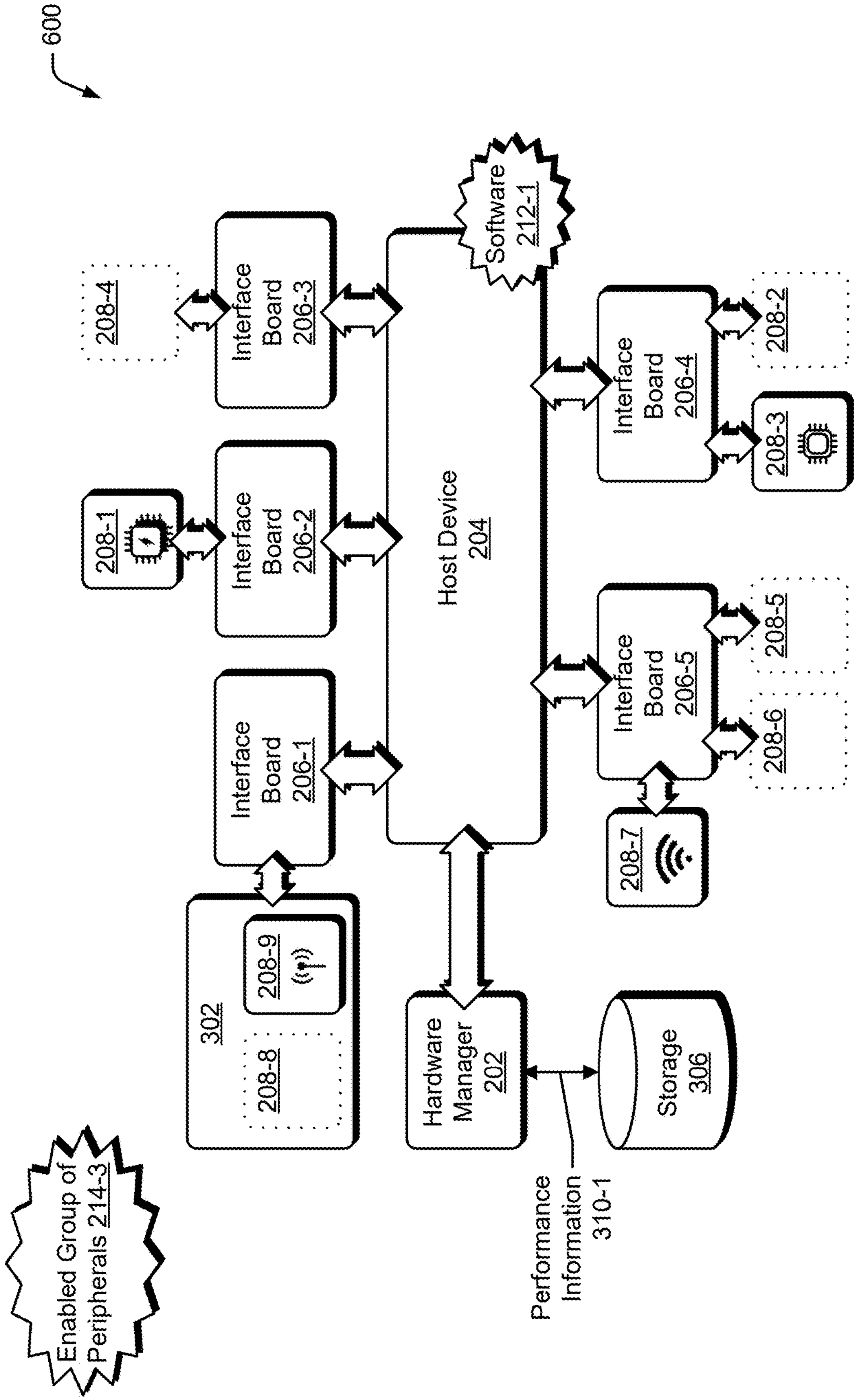
Figures 2, 6:
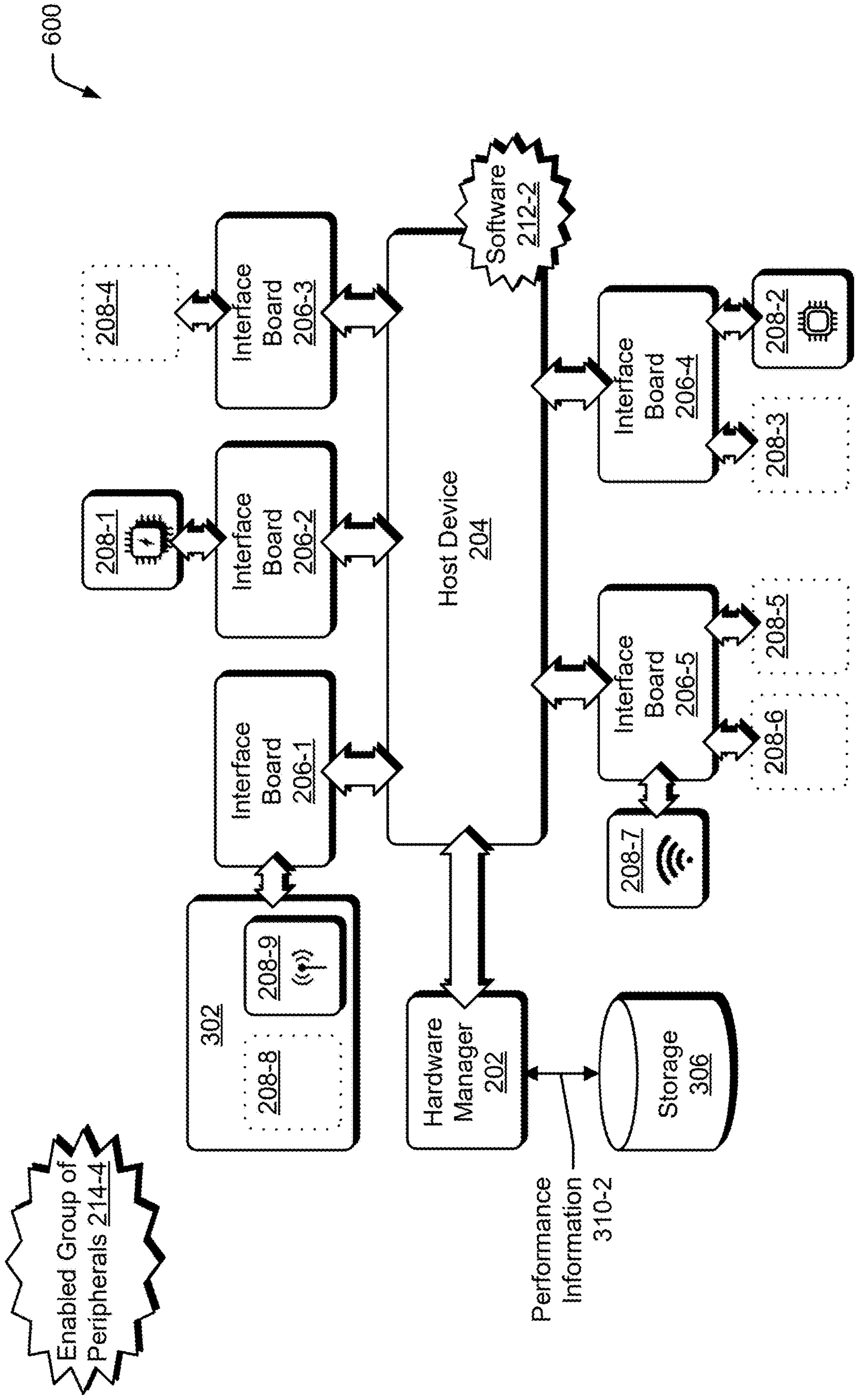

FIG. 6-1 is an example illustration of a system 600 including a plurality of peripherals 208-1 to 208-9. In this example, the hardware manager 202 enables a third enabled group of peripherals 214-3 of the plurality of peripherals 208 coupled to the host device 204 for testing 106. The third enabled group of peripherals 214-3 can include the peripherals 208-1, 208-3, 208-7, and 208-9. The hardware manager 202 also disables peripherals 208 that are not part of the third enabled group of peripherals 214-3. For example, the hardware manager 202 disables the peripherals 208-2, 208-4, 208-5, 208-6, and 208-8.

As part of the testing 106, the hardware manager 202 can initiate execution of first software 212-1 on the host device 204 with the third enabled group of peripherals 214-3. While executing, the software 212-1 can use and/or operate on the third enabled group of peripherals 214-3. For example, the software 212-1 can send and receive information to and from at least one peripheral 208 of the third enabled group of peripherals 214-3, can control at least one peripheral 208 of the third enabled group of peripherals 214-3, and/or can configure at least one peripheral of the third enabled group of peripherals 214-3. As further examples, the software 212-1 can activate a peripheral 208, can operate a peripheral 208, can output data via a peripheral 208, can receive input data from a peripheral 208, can store data on or via a peripheral 208, and/or can otherwise use and/or operate on at least one peripheral 208 of the third enabled group of peripherals 214-3. The hardware manager 202 can gather and store first performance information 310-1 in the storage 306. The first performance information 310-1 can correspond to execution of the software 212-1 with the third enabled group of peripherals 214-3. In some implementations, the hardware manager 202 can automatically proceed to initiate testing of another software 212 with another group of peripherals 214, as further described with respect to FIG. 6-2.

FIG. 6-2 is another example illustration of the system 600, which includes the plurality of peripherals 208-1 to 208-9. In this example, the hardware manager 202 enables a fourth enabled group of peripherals 214-4 of the plurality of peripherals 208 coupled to the host device 204. The fourth enabled group of peripherals 214-4 can include the peripherals 208-1, 208-2, 208-7, and 208-9. To transition from the third enabled group of peripherals 214-3 to the fourth enabled group of peripherals 214-4, the hardware manager 202 can disable at least one peripheral 208 and enable at least one other peripheral 208 of a same peripheral type 210 that corresponds to requirements of a consumer product 122. In this example, the hardware manager 202 disables the peripheral 208-3 and enables the peripheral 208-2, which has the same peripheral type 210-2 as the disabled peripheral 208-3.

As part of the testing 106, the hardware manager 202 can initiate execution of software 212-2 on the host device 204 with the fourth enabled group of peripherals 214-4. The hardware manager 202 can gather and store second performance information 310-2 in the storage 306. The second performance information 310-2 can correspond to execution of the software 212-2 with the fourth enabled group of peripherals 214-4. The hardware manager 202 can evaluate the performance information 310-2 stored in the storage 306 to determine groups of peripherals 214 that meet requirements of a product 122.

Figure 7:
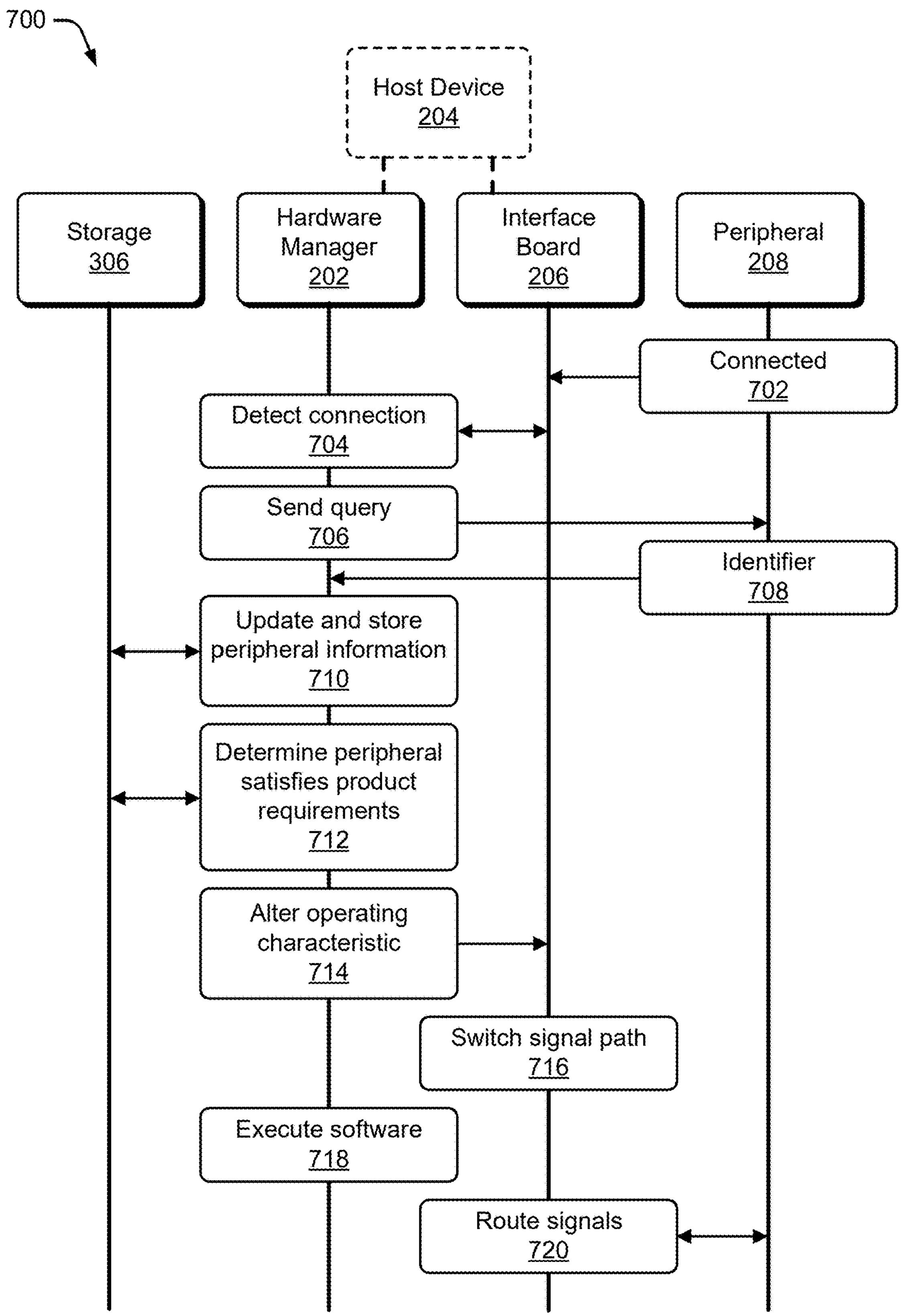
FIG. 7 illustrates an example sequence diagram showing operations and communications between a hardware manager, an interface board, a peripheral, and storage.

FIG. 7 illustrates an example sequence diagram 700 showing operations and communications between the hardware manager 202, the interface board 206, a peripheral 208, and the storage 306. The hardware manager 202 and interface board 206 can both be connected to the host device 204. At 702, the peripheral 208 is connected to the interface board 206. At 704, the hardware manager 202 detects that the peripheral 208 has been newly coupled to the host device 204 via the interface board 206. The hardware manager 202 can detect the peripheral 208 via communications with the interface board 206. For example, the hardware manager 202 can poll the interface board 206 to check for newly connected peripherals, the interface board 206 can inform the hardware manager 202 of the connection of the peripheral 208, and/or the hardware manager 202 can otherwise detect the connection of the peripheral 208.

At 706, the hardware manager 202 queries the peripheral 208 for an identifier of the peripheral 208. The query can be sent via the interface board 206. The query can be sent in response to detection of the peripheral 208. At 708, the hardware manager 202 receives the identifier of the peripheral 208, such as via the interface board 206.

At 710, the hardware manager 202 updates and stores information of the peripheral 208 in the storage 306 based on the identifier. For example, the hardware manager 202 can check local or remote storage 306 for information about the peripheral 208 based on the identifier and update the information accordingly. The hardware manager 202 may also receive peripheral information 312 along with the identifier and can store the received information 312 in the storage 306. The hardware manager 202 can additionally update stored information to indicate the peripheral 208 has been connected to the host device 204 via the interface board 206.

At 712, the hardware manager 202 determines whether the peripheral 208 satisfies requirements of a product 122, such as by comparing the information of the peripheral 208 to requirements stored in the storage 306. At 714, if the peripheral 208 satisfies the requirements, the hardware manager 202 sends instructions, data, commands, and/or other signals to the interface board 206 to alter at least one operating characteristic of interface circuitry on the interface board 206 to enable operation of the peripheral 208 with the host device 204. In this manner, the hardware manager 202 can selectively distribute, via interface circuitry on the interface board 206, signaling between the host device 204 and the peripheral 208.

At 716, the interface board 206 switches a signal path from the host device 204 to the peripheral 208, such as via multiplexing, to enable the peripheral 208. At 718, the hardware manager 20 initiates execution of the software 212. At 720, the interface board routes signals to and from the enabled peripheral 208. In this manner, peripherals can be exchanged and/or updated with alternative and/or additional peripherals 208, including a combination of peripherals 208 that does not exist in a product. The combination of peripherals 208 that does not exist may include one or more new peripherals 208 that include new features and/or one or more new peripherals 208 that may substitute obsolete peripherals 208 (e.g., those that are no longer manufactured, those that are no longer supported by an OEM).

Example Method

Figure 8:
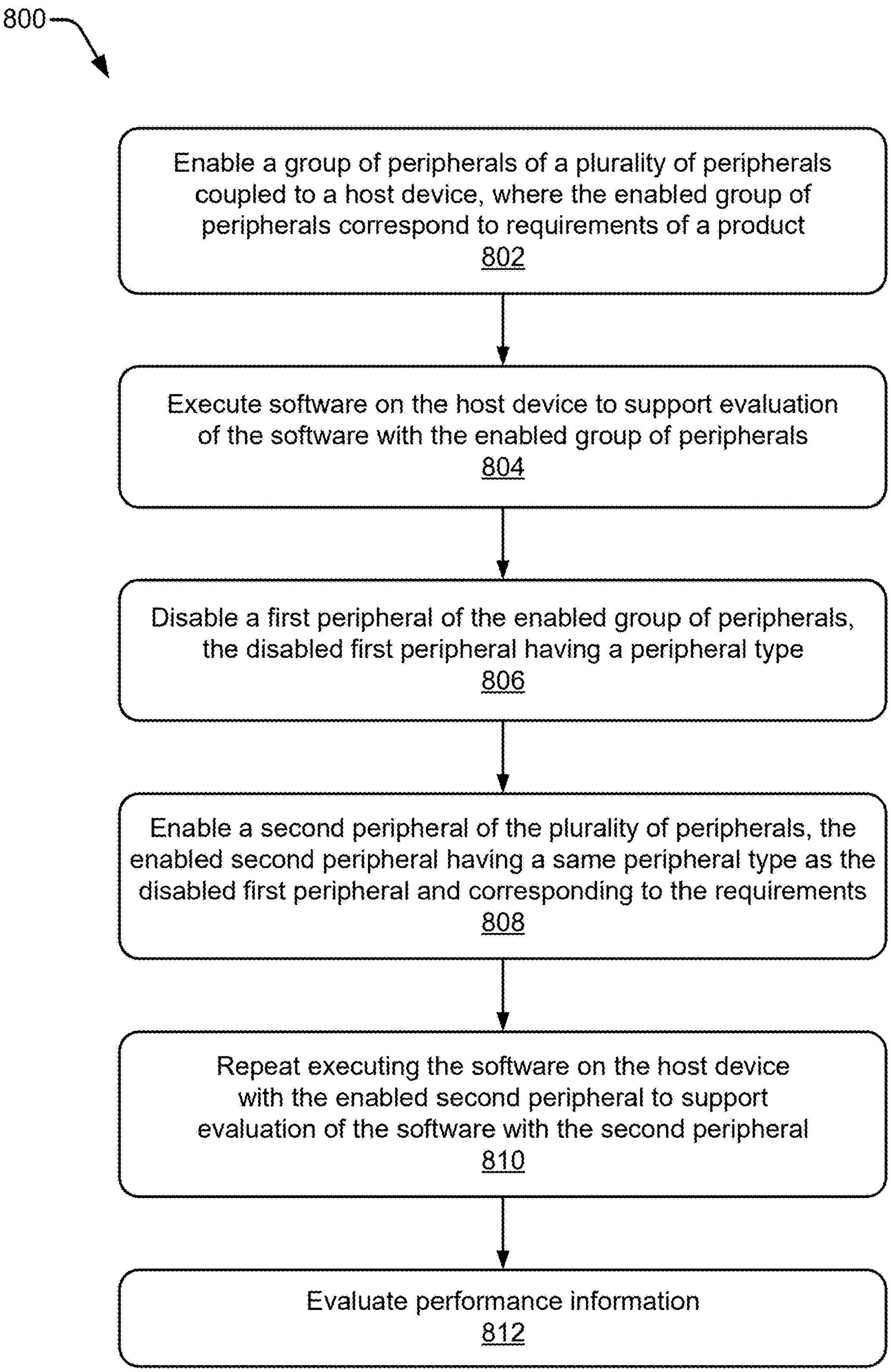
FIG. 8 illustrates an example method for performing an aspect of software-defined hardware.

FIG. 8 depicts an example method 800 for implementing aspects of software-defined hardware. The method 800 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to entities detailed in the environments 200-1 and 200-2 of FIG. 2 and the systems 300 and 600 of FIGS. 3, 6-1, and 6-2, reference to which is made for example only. The method 800 can be performed by the hardware manager 202, but the techniques are not limited to performance by one entity or multiple entities operating on one device.

At 802 in FIG. 8, a group of peripherals of a plurality of peripherals coupled to a host device is enabled. The enabled group of peripherals can correspond to requirements of a product. For example, a hardware manager 202 enables a group of peripherals 214 of a plurality of peripherals 208 via at least one interface board 206, as described with respect to FIGS. 2, 3, 6-1, and 6-2. The enabled group of peripherals 214 can correspond to requirements of a product 122. The requirements of the product 122 can be received and/or stored in configuration data 308.

At 804, software is executed on the host device to support evaluation of the software with the enabled group of peripherals. For example, the hardware manager 202 initiates execution of software 212 for an enabled group of peripherals 214 to support evaluation of the software 212 with the enabled group of peripherals 214, as shown in FIGS. 2 and 6-1.

In general, evaluation of the software 212 can include validating one or more aspects of the software 212. In some cases, the evaluation process involves generating performance information 310, which can be passed to the storage 306. In other cases, the evaluation process involves running the software 212 for a particular amount of time and does not necessarily involve generating data. In one aspect, an engineer manually validates the software 212 by observing its execution on the host device 204 or by analyzing the performance information 310. In another aspect, validation of the software 212 (or portions thereof) can be automated. For example, the hardware manager 202 can collect and/or analyze the performance information 310 to determine whether or not the software 212 met certain performance requirements.

At 806, a first peripheral of the enabled group of peripherals is disabled. For example, the hardware manager 202 disables a first peripheral (e.g., the peripheral 208-2 in FIG. 2 or the peripheral 208-3 in FIG. 6-2) via the interface board 206. The disabled first peripheral 208 can have a peripheral type 210.

At 808, a second peripheral of the plurality of peripherals is enabled. For example, the hardware manager 202 enables a second peripheral 208 via the interface board 206. The enabled second peripheral 208 can have the same peripheral type 210 as the disabled first peripheral 208 and can correspond to the requirements. The enabled second peripheral 208 can represent the peripheral 208-3 in FIG. 2 or the peripheral 208-2 in FIG. 6-2. For example, signaling between the host device 204 and peripherals 208 can be distributed via interface circuitry on the interface board 206 and peripherals 208 of the same and different peripheral types 210 can be enabled and disabled by altering at least one operating characteristic of the interface circuitry. Altering of the at least one operating characteristic of the interface circuitry can include switching a signal path between the host device 204 and the first peripheral 208 to a signal path between the host device 204 and the second peripheral 208 via multiplexing to disable the first peripheral 208 and enable the second peripheral 208.

At 810, execution of the software is repeated on the host device with the enabled second peripheral to support evaluation of the software with the enabled second peripheral. For example, the hardware manager 202 initiates execution of the software 212 on the host device 204 to support evaluation of the software 212 with the second peripheral 208. This enables the software 212 to be evaluated while the host device 204 is connected to the second peripheral (and any other peripheral from the enabled group of peripherals that was not disabled). The second peripheral and the other enabled peripherals represent another enabled group of peripherals 214. This other enabled group of peripherals 214 differs from the previous enabled group of peripherals 214 because it includes the second peripheral 208 and does not include the disabled first peripheral 208.

According to a possible implementation, the software 212 can be iteratively executed with different enabled groups of peripherals 214, where different enabled groups of peripherals 214 include at least one enabled different peripheral 208 of a same peripheral type 210 as a disabled peripheral 208. According to a possible example, the repetition of the execution of the software can be for execution of the same software or different software.

In one example, the software 212 executed at 804 represents a baseline version of software and the software 212 executed at 810 represents a modified or updated version of the baseline software. In some cases, the software 212 executed at 810 has been modified to support operation of the second peripheral 208. In another example, the software 212 executed at 804 and 810 represents a same version of software. In this case, the software 212 is tested with different enabled groups of peripherals to ensure compatibility. As part of the evaluation process, performance information 310 generated and collected at 804 can be compared with the performance information 310 generated and collected at 810 to assist with the product development process 100.

At 812, performance information corresponding to operation of the host device with different enabled groups of peripherals is evaluated and lists of groups of peripherals that meet product requirements are stored. For example, the hardware manager 202 evaluates performance information 310 and stores lists of groups of peripherals 314 that meet product requirements on a storage 306. According to a possible implementation, the hardware manager 202 evaluates performance information 310 while iteratively executing the software 212.

CONCLUSION

Although techniques using and apparatuses including software-defined hardware have been described in language specific to features and/or methods, it is to be understood that the subject of the appended claims is not necessarily limited to the specific features or methods described. Rather, the specific features and methods are disclosed as example implementations of software-defined hardware.

Some Examples are Described Below.

Example 1: A method comprising:

enabling a group of peripherals of a plurality of peripherals coupled to a host device, where the enabled group of peripherals correspond to requirements of a product;

executing software on the host device to support evaluation of the software with the enabled group of peripherals;

disabling a first peripheral of the enabled group of peripherals, where the disabled first peripheral has a peripheral type;

enabling a second peripheral of the plurality of peripherals, where the enabled second peripheral has a same peripheral type as the disabled first peripheral and corresponds to the requirements; and repeating executing the software on the host device with the enabled second peripheral to support evaluation of the software with the second enabled peripheral.

Example 2: The method of example 1, further comprising:

iteratively executing the software with different enabled groups of peripherals, where different enabled groups of peripherals include at least one different peripheral of the same peripheral type; and evaluating performance information corresponding to operation of the host device with different enabled groups of peripherals while iteratively executing the software.

Example 3: The method of any previous example, wherein at least some of the different enabled groups of peripherals include different peripherals of different peripheral types, and wherein the method further comprises storing a list of groups of peripherals that meet the requirements based on the performance information.

Example 4: The method of any previous example, further comprising:

disabling a third peripheral of the enabled group of peripherals, where the disabled third peripheral has a different peripheral type than the first peripheral;

enabling a fourth peripheral of the plurality of peripherals, where the enabled fourth peripheral has a same peripheral type as the disabled third peripheral and corresponds to the requirements; and repeating executing the software on the host device with the enabled second peripheral and the enabled fourth peripheral to support evaluation of the software with the enabled second peripheral.

Example 5: The method of any previous example, further comprising selectively distributing, via interface circuitry, signaling between the host device and the first and second peripherals, wherein enabling the second peripheral further comprises altering at least one operating characteristic of the interface circuitry to enable operation of the second peripheral with the host device.

Example 6: The method of example 5, wherein altering the at least one operating characteristic of the interface circuitry comprises switching a signal path between the host device and the first peripheral to a signal path between the host device and the second peripheral via multiplexing to disable the first peripheral and enable the second peripheral.

Example 7: The method of any previous example, further comprising:

querying at least one peripheral of the plurality of peripherals coupled to the host device for an identifier of the at least one peripheral;

receiving the identifier of the at least one peripheral; and storing information of the at least one peripheral based on the identifier of the at least one peripheral, wherein the group of peripherals are enabled based on the stored information.

Example 8: The method of example 7, wherein the at least one peripheral comprises the second peripheral, wherein the method further comprises comparing the information of the second peripheral to the requirements of the product, and wherein enabling the second peripheral further comprises enabling the second peripheral based on the second peripheral satisfying at least one requirement of the product.

Example 9: The method of example 8, further comprising detecting the second peripheral has been newly coupled to the host device, wherein querying the second peripheral comprises querying the second peripheral in response to detecting the second peripheral has been newly coupled to the host device.

Example 10: The method of any previous example, further comprising:

storing peripheral information corresponding to the plurality of peripherals coupled to the host device;

determining the second peripheral has replaced a removed peripheral that is no longer coupled to the host device; and updating the stored peripheral information based on determining the second peripheral has replaced the removed peripheral.

Example 11: The method of any previous example, further comprising:

receiving a configuration for a product, the configuration including the requirements of the product; and selecting the group of peripherals based on the requirements, wherein enabling a group of peripherals comprises enabling the selected group of peripherals.

Example 12: The method of any previous example, wherein a type of peripheral comprises an embedded controller, a central processing unit, a universal serial bus controller, an audio codec circuit, or a local area network controller.

Example 13: A computing system comprising:

a processor;

a memory coupled to the processor, the memory having instructions stored thereon that, responsive to execution by the processor, perform operations comprising:

enabling a group of peripherals of a plurality of peripherals coupled to a host device, where the enabled group of peripherals correspond to requirements of a product;

executing software on the host device with the enabled group of peripherals to support evaluation of the software with the enabled group of peripherals;

disabling a first peripheral of the enabled group of peripherals, the disabled first peripheral having a peripheral type;

enabling a second peripheral of the plurality of peripherals, the enabled second peripheral having a same peripheral type as the disabled first peripheral and corresponding to the requirements; and repeating executing the software on the host device with the enabled second peripheral to support evaluation of the software with the enabled second peripheral.

Example 14: The computing system of example 13, wherein the instructions perform operations comprising:

iteratively executing the software with different enabled groups of peripherals, where the different enabled groups of peripherals include at least one different peripheral of the same peripheral type; and evaluating performance information corresponding to operation of the host device with different enabled groups of peripherals while iteratively executing the software.

Example 15: The computing system of example 14, wherein at least some of the different enabled groups of peripherals include different peripherals of different peripheral types, and wherein the instructions perform operations comprising storing a list of groups of peripherals that meet the requirements based on the performance information.

Example 16: The computing system of any one of examples 13-15, wherein the instructions perform operations comprising:

disabling a third peripheral of the enabled group of peripherals, the disabled third peripheral having a different peripheral type than the first peripheral;

enabling a fourth peripheral of the plurality of peripherals, the enabled fourth peripheral having a same peripheral type as the disabled third peripheral and corresponding to the requirements; and repeating executing the software on the host device with the enabled second peripheral and the enabled fourth peripheral.

Example 17: The computing system of any one of examples 13-16, wherein enabling the second peripheral further comprises altering at least one operating characteristic of interface circuitry that is coupled between the host device and the first and second peripherals, wherein the altering enables operation of the second peripheral with the host device.

Example 18: The computing system of example 17, wherein the interface circuitry comprises multiplexing circuitry, where the first peripheral is disabled and the second peripheral is enabled by switching a signal path between the host device and the first peripheral to a signal path between the host device and the second peripheral using the multiplexing circuitry.

Example 19: A computer-readable storage medium comprising instructions that, responsive to execution by a processor, cause the processor to:

enable a group of peripherals of a plurality of peripherals coupled to a host device, where the enabled group of peripherals correspond to requirements of a product;

execute software on the host device with the enabled group of peripherals;

disable a first peripheral of the enabled group of peripherals, the disabled first peripheral having a peripheral type;

enable a second peripheral of the plurality of peripherals, the enabled second peripheral having a same peripheral type as the disabled first peripheral and corresponding to the requirements; and repeat executing the software on the host device with the enabled second peripheral.

Example 20: The computer-readable storage medium of example 19, where the instructions cause the processor to:

iteratively execute the software with different enabled groups of peripherals, where at least two different enabled groups of peripherals include at least one different peripheral of the same peripheral type;

evaluate performance information corresponding to operation of the host device with different enabled groups of peripherals while iteratively executing the software; and store a list of groups of peripherals that meet the requirements based on the performance information.

What is claimed is:

1. A method comprising:

iteratively executing software on a host device with different enabled groups of peripherals coupled to the host device, where the different enabled groups of peripherals include at least one different peripheral of a same peripheral type; and evaluating performance information corresponding to operation of the host device with the different enabled groups of peripherals while iteratively executing the software, wherein the executing further comprises:

enabling a group of peripherals of a plurality of peripherals coupled to the host device, where the enabled group of peripherals correspond to requirements of a product;

executing the software on the host device to support evaluation of the software with the enabled group of peripherals;

disabling a first peripheral of the enabled group of peripherals, the disabled first peripheral having a peripheral type;

enabling a second peripheral of the plurality of peripherals, the enabled second peripheral having the same peripheral type as the disabled first peripheral and corresponding to the requirements; and repeating executing the software on the host device with the enabled second peripheral to support evaluation of the software with the enabled second peripheral.

2. The method of claim 1, wherein at least some of the different enabled groups of peripherals include different peripherals of different peripheral types, and wherein the method further comprises storing a list of groups of peripherals that meet the requirements based on the performance information.

3. The method of claim 1, wherein the executing further comprises:

disabling a third peripheral of the enabled group of peripherals, the disabled third peripheral having a different peripheral type than the first peripheral;

enabling a fourth peripheral of the plurality of peripherals, the enabled fourth peripheral having a same peripheral type as the disabled third peripheral and corresponding to the requirements; and repeating executing the software on the host device with the enabled second peripheral and the enabled fourth peripheral to support evaluation of the software with the enabled second peripheral.

4. The method of claim 1, further comprising selectively distributing, via interface circuitry, signaling between the host device and the first and second peripherals, wherein enabling the second peripheral further comprises altering at least one operating characteristic of the interface circuitry to enable operation of the second peripheral with the host device.

5. The method of claim 1, further comprising:

querying at least one peripheral of the plurality of peripherals coupled to the host device for an identifier of the at least one peripheral;

receiving the identifier of the at least one peripheral; and storing information of the at least one peripheral based on the identifier of the at least one peripheral, wherein the group of peripherals are enabled based on the stored information.

6. The method according to claim 1, further comprising:

storing peripheral information corresponding to the plurality of peripherals coupled to the host device;

determining the second peripheral has replaced a removed peripheral that is no longer coupled to the host device; and updating the stored peripheral information based on determining the second peripheral has replaced the removed peripheral.

7. The method of claim 1, wherein a type of peripheral comprises an embedded controller, a central processing unit, a universal serial bus controller, an audio codec circuit, or a local area network controller.

8. The method of claim 1, further comprising:

receiving a configuration for a product, the configuration including the requirements of the product; and selecting the group of peripherals based on the requirements, wherein enabling a group of peripherals comprises enabling the selected group of peripherals.

9. The method of claim 4, wherein altering the at least one operating characteristic of the interface circuitry comprises switching a signal path between the host device and the first peripheral to a signal path between the host device and the second peripheral via multiplexing to disable the first peripheral and enable the second peripheral.

10. The method of claim 5, wherein the at least one peripheral comprises the second peripheral, wherein the method further comprises comparing the information of the second peripheral to the requirements of the product, and wherein enabling the second peripheral further comprises enabling the second peripheral based on the second peripheral satisfying at least one requirement of the product.

11. The method of claim 10, further comprising detecting the second peripheral has been newly coupled to the host device, wherein querying the second peripheral comprises querying the second peripheral in response to detecting the second peripheral has been newly coupled to the host device.

12. A computing system comprising:

a processor;

a memory coupled to the processor, the memory having instructions stored thereon that, responsive to execution by the processor, perform operations comprising:

iteratively executing software on a host device with different enabled groups of peripherals coupled to the host device, where the different enabled groups of peripherals include at least one different peripheral of a same peripheral type; and evaluating performance information corresponding to operation of the host device with the different enabled groups of peripherals while iteratively executing the software, wherein the executing further comprises:

enabling a group of peripherals of a plurality of peripherals coupled to the host device, where the enabled group of peripherals correspond to requirements of a product;

executing the software on the host device to support evaluation of the software with the enabled group of peripherals;

disabling a first peripheral of the enabled group of peripherals, the disabled first peripheral having a peripheral type;

enabling a second peripheral of the plurality of peripherals, the enabled second peripheral having the same peripheral type as the disabled first peripheral and corresponding to the requirements; and repeating executing the software on the host device with the enabled second peripheral to support evaluation of the software with the enabled second peripheral.

13. The computing system of claim 12, wherein at least some of the different enabled groups of peripherals include different peripherals of different peripheral types, and wherein the instructions perform operations comprising storing a list of groups of peripherals that meet the requirements based on the performance information.

14. The computing system of claim 12, wherein the instructions perform operations comprising:

disabling a third peripheral of the enabled group of peripherals, the disabled third peripheral having a different peripheral type than the first peripheral;

enabling a fourth peripheral of the plurality of peripherals, the enabled fourth peripheral having a same peripheral type as the disabled third peripheral and corresponding to the requirements; and repeating executing the software on the host device with the enabled second peripheral and the enabled fourth peripheral.

15. The computing system of claim 12, wherein enabling the second peripheral further comprises altering at least one operating characteristic of interface circuitry that is coupled between the host device and the first and second peripherals, wherein the altering enables operation of the second peripheral with the host device.

16. The computing system of claim 15, wherein the interface circuitry comprises multiplexing circuitry, where the first peripheral is disabled and the second peripheral is enabled by switching a signal path between the host device and the first peripheral to a signal path between the host device and the second peripheral using the multiplexing circuitry.

17. A computer-readable storage medium comprising instructions that, responsive to execution by a processor, cause the processor to:

iteratively execute software on a host device with different enabled groups of peripherals coupled to the host device, where the different enabled groups of peripherals include at least one different peripheral of a same peripheral type; and evaluate performance information corresponding to operation of the host device with the different enabled groups of peripherals while iteratively executing the software, wherein the processor is further configured to:

enable a group of peripherals of a plurality of peripherals coupled to a host device, where the enabled group of peripherals correspond to requirements of a product;

execute software on the host device to support evaluation of the software with the enabled group of peripherals;

disable a first peripheral of the enabled group of peripherals, the disabled first peripheral having a peripheral type;

enable a second peripheral of the plurality of peripherals, the enabled second peripheral having a same peripheral type as the disabled first peripheral and corresponding to the requirements; and repeat executing the software on the host device with the enabled second peripheral to support evaluation of the software with the enabled second peripheral.

18. The computer-readable storage medium of claim 17, where the instructions cause the processor to:

store a list of groups of peripherals that meet the requirements based on the performance information.

19. The computer-readable storage medium of claim 17, wherein at least some of the different enabled groups of peripherals include different peripherals of different peripheral types.

20. The computer-readable storage medium of claim 17, wherein the instructions cause the processor to:

disable a third peripheral of the enabled group of peripherals, the disabled third peripheral having a different peripheral type than the first peripheral;

enable a fourth peripheral of the plurality of peripherals, the enabled fourth peripheral having a same peripheral type as the disabled third peripheral and corresponding to the requirements; and repeat executing the software on the host device with the enabled second peripheral and the enabled fourth peripheral.

* * * * *